United States Patent [19]
Boylan et al.

[11] Patent Number: 5,929,618
[45] Date of Patent: Jul. 27, 1999

[54] SYSTEM AND METHOD FOR SYNCHRONIZING AND INTERLEAVING POWER MODULES

[75] Inventors: Jeffrey J. Boylan, Dallas; Richard H. Hock, Garland; Kenneth J. Timm, Rockwall, all of Tex.

[73] Assignee: Lucent Technologies Inc., Murray Hill, N.J.

[21] Appl. No.: 09/090,430

[22] Filed: Jun. 4, 1998

[51] Int. Cl.[6] .................................................. G05F 1/40
[52] U.S. Cl. ..................................... 323/282; 323/289
[58] Field of Search ................................ 323/222, 266, 323/282, 283, 281, 289, 290, 303, 351

[56] References Cited

U.S. PATENT DOCUMENTS

| | | | |
|---|---|---|---|
| 4,536,700 | 8/1985 | Bello et al. .............................. | 23/285 |
| 4,580,090 | 4/1986 | Bailey et al. ............................ | 323/303 |
| 4,916,380 | 4/1990 | Burroughs ............................... | 323/282 |
| 4,943,902 | 7/1990 | Severinsky ............................... | 363/80 |
| 4,959,606 | 9/1990 | Forge ...................................... | 323/286 |
| 5,055,767 | 10/1991 | Nelson .................................... | 23/283 |
| 5,430,641 | 7/1995 | Kates ...................................... | 363/133 |
| 5,444,356 | 8/1995 | Reynolds et al. ....................... | 323/282 |
| 5,808,455 | 9/1998 | Schwartz et al. ....................... | 323/271 |
| 5,818,207 | 10/1998 | Hwang .................................... | 323/288 |
| 5,838,147 | 11/1998 | Suzuki et al. ........................... | 323/289 |

*Primary Examiner*—Adolf Deneke Berhane

[57] ABSTRACT

For use in a distributed power system having first and second power processing modules, a power processing module for, and method of synchronizing an operation of the second power processing module with the first power processing module and a power converter employing the power processing module or the method. In one embodiment, the power processing module includes: (1) a synchronization input terminal adapted to receive a first control signal, (2) a free-running oscillator that generates a gate drive signal for controlling a switch of the power processing module, the gate drive signal having a frequency that is a free-running frequency of the power processing module, (3) a synchronization circuit, coupled to the synchronization input terminal and the free-running oscillator, that synchronizes the gate drive signal with the first control signal and (4) a frequency setting circuit, coupled to the synchronization input terminal and the free-running oscillator, that modifies an operation of the free-running oscillator.

19 Claims, 5 Drawing Sheets

SYSTEM AND METHOD FOR SYNCHRONIZING AND INTERLEAVING POWER MODULES

TECHNICAL FIELD OF THE INVENTION

The present invention is directed, in general, to power processing and, more specifically, to a system and method for synchronizing and interleaving power modules.

BACKGROUND OF THE INVENTION

A power processing module or power converter is a power processing circuit that converts an input voltage or current source into a specified output voltage or current. Power processing modules are typically used in a wide variety of applications to provide a source of regulated power. There is a growing demand, particularly the telecommunication and computer industries, for increased current handling capabilities in power processing modules.

A common approach to increase the current handling capacity of existing DC/DC power processing modules is to add additional power stages to an already existing power module. This distributive approach provides for greater expandability of the power system, permitting the use of lower current distribution buses. Furthermore, a distributed power system with the ability to use standard power processing modules allows for redundancy, which in turn, increases the reliability of the entire power system. Examples of distributed power systems include the use of power modules with their own individual isolated input filters or different input buses. Other distributed systems may employ power modules that share a common input bus or filter, or alternatively share a common output bus, i.e., paralleled outputs, for increased power or redundancy.

Distributed power systems, however, have inherent shortcomings. For example, in a paralleled distributed power system, i.e., the power modules share a common output bus, the power modules' switches are required to be turned on simultaneously, resulting in very large current "steps." These large current steps, in turn, increase the stresses on the input and output filter components, such as the input and output filter capacitors. The resultant impact of the increased stresses is to decrease the overall system reliability. Additionally, the large current steps also increase the electromagnetic interference (EMI) generated by the power converter. To overcome the above-mentioned problems, larger input and output filter components are required to minimize the input and output ripple currents and the EMI thus generated, increasing the component count and cost of the power converter.

The performance of a distributed power system may be improved by synchronizing and/or interleaving the switching frequencies of the individual power modules. When multiple power processing modules are employed in a distributed power system to increase the overall current capacity, it is also desirable to minimize the bandwidth of the switching EMI spectrum by confining the switching frequency of the power converter switches to a single frequency. Reducing the switching frequencies of the power converters to a single frequency also reduces the electrical noise generated by the switches to a single frequency, which places less exacting requirements on the design of the input and output filters. The use of a single switching frequency also eliminates beat frequency interactions caused by differences in switching frequencies.

The typical approach to implementing a single frequency system of power modules is to merely drive all power stages with the same switching drive signal. While synchronization is inherent in the method, the input current drawn from the supply source during the "on" time of the power switch is increased proportionally to the number of power modules in the distributed power system. This large "slug" of current is stressful on filter components and is the source of significant EMI, both of the line conducted as well as the radiated variety. A similar problem manifests itself at the output of the system.

A substantial improvement over the previous technique can be realized by staggering or "interleaving" the drive pulses, with respect to one another, such that the modules are driven out of phase. Synchronization of switching frequency is retained while adding the benefits of interleaving. An auxiliary circuit is used to generate two drive signals which are phase-shifted from one another by 180 degrees or T/2, where T is the period of the switching cycle. This approach, however, requires complex circuitry to ensure strict T/2 operation and is limited to two anti-phase driven signals.

Accordingly, what is needed in the art is an improved method of synchronizing the switching frequencies of power processing modules that mitigates or eliminates the above-described shortcomings.

SUMMARY OF THE INVENTION

To address the above-discussed deficiencies of the prior art, the present invention provides, for use in a distributed power system having first and second power processing modules, a power processing module for, and method of synchronizing an operation of the second power processing module with the first power processing module and a power converter employing the power processing module or the method. In one embodiment, the power processing module includes: (1) a synchronization input terminal adapted to receive a first control signal, (2) a free-running oscillator that generates a gate drive signal for controlling a switch of the power processing module, the gate drive signal having a frequency that is a free-running frequency of the power processing module, (3) a synchronization circuit, coupled to the synchronization input terminal and the free-running oscillator, that synchronizes the gate drive signal with the first control signal and (4) a frequency setting circuit, coupled to the synchronization input terminal and the free-running oscillator, that modifies an operation of the free-running oscillator.

The present invention therefore introduces the broad concept of controlling a distributed power system with "daisy-chained" converter control circuits by way of a synchronization signal that is a function of the drive waveform applied to one of the power converters in the chain. The present invention also provides for automatically interleaving the power modules' switching frequencies with an adjustable interleave angle. Additionally, the present invention also discloses a novel circuit to provide for automatic control of a free-running power module allowing a standard power module to operate as either a free-running or synch-adjusted power module with no modifications required. The present invention also permits synchronizing power modules to each other, even if they have the same "free-running switching frequency" or, alternatively, allows the power modules to "free run" if no synchronization circuit is present.

In one embodiment, the synchronization circuit phase-shifts the gate drive signal with respect to the first control signal. As discussed above, the interleaving of the gate drive signal and the first control signal can be varied.

In one embodiment, the power processing module further includes a synchronization output terminal, coupled to the free-running oscillator, that provides the gate drive signal. The gate drive signal becomes the first control signal when applied to a synchronization input terminal of another power processing module.

In one embodiment, the frequency setting circuit lowers a frequency of the gate drive signal with respect to the first control signal. It should be apparent to those skilled in the art that the frequency setting circuit may reside in one of a plurality of paralleled coupled power processing modules. Of course, more than one of the plurality of paralleled coupled power processing modules may include the frequency setting circuit.

In one embodiment of the present invention, the synchronization circuit detects a rising edge of the first control signal (synchronization signal). Of course, the synchronization circuit can detect a falling edge or another characteristic of the synchronization signal.

In one embodiment, the first control signal is lower in frequency than a free-running, or natural, frequency of the power processing module. In another embodiment, however, the first control signal is higher in frequency than the natural frequency of the power processing module.

In one embodiment of the present invention, the first and second drive waveforms are pulse width modulated. Those skilled in the art are familiar with pulse width modulation. Other modulation schemes are within the broad scope of the present invention, however.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
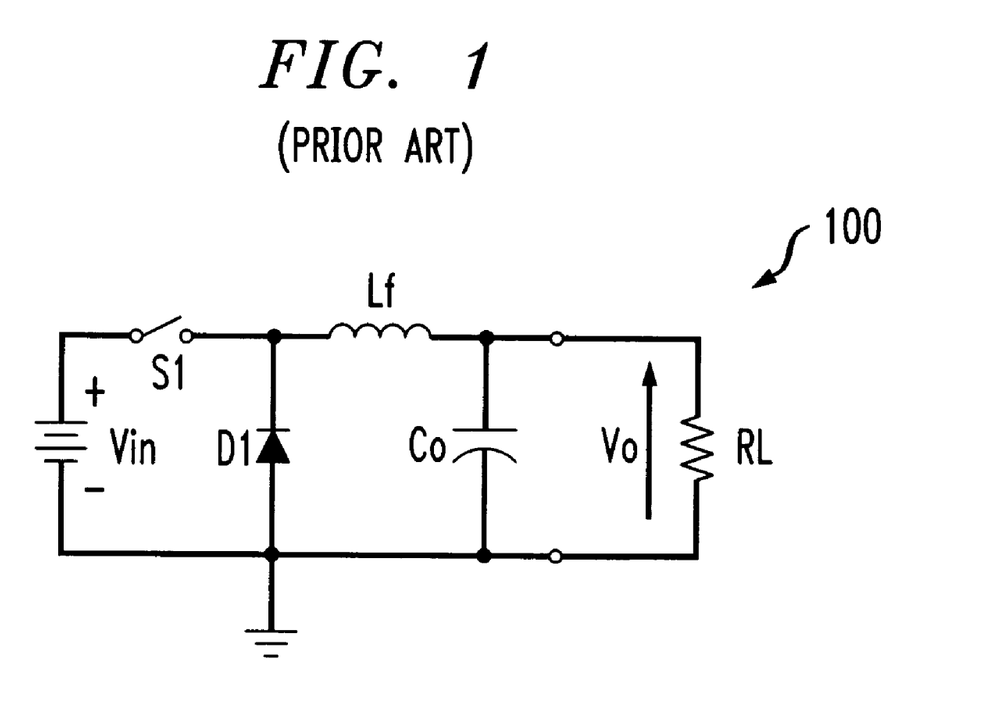
FIG. 1 illustrates a conventional buck regulator module.

Referring initially to FIG. 1, illustrated is a conventional buck regulator module 100. The buck regulator module 100 includes a controllable switch S1, a diode D1, an inductor Lf and an output capacitor Co. Also shown is an input supply voltage Vin and an output voltage Vo, which is measured across an electrical load R1.

The operation of the buck regulator 100 is described hereinafter. When the switch S1 turns on, i.e., conducting, the voltage across the inductor Lf is (Vin−Vo) and current flows from the input supply voltage Vin to enable the output voltage Vo. When the switch S1 is turned off, the inductor current through the inductor Lf continues to flow and the cathode of the diode D1 is pulled below ground by the back electromagnetic force (EMF) of the inductor Lf. With its cathode below ground, the diode D1 begins to conduct and the voltage across the inductor Lf is −Vo with an output current flowing through the diode D1 and the inductor Lf to Vo. At steady-state, the voltage across Lf averages out to zero, therefore:

$$Vo = Vin \cdot D \tag{1}$$

where D is the duty cycle of the switch S1.

Figure 2:
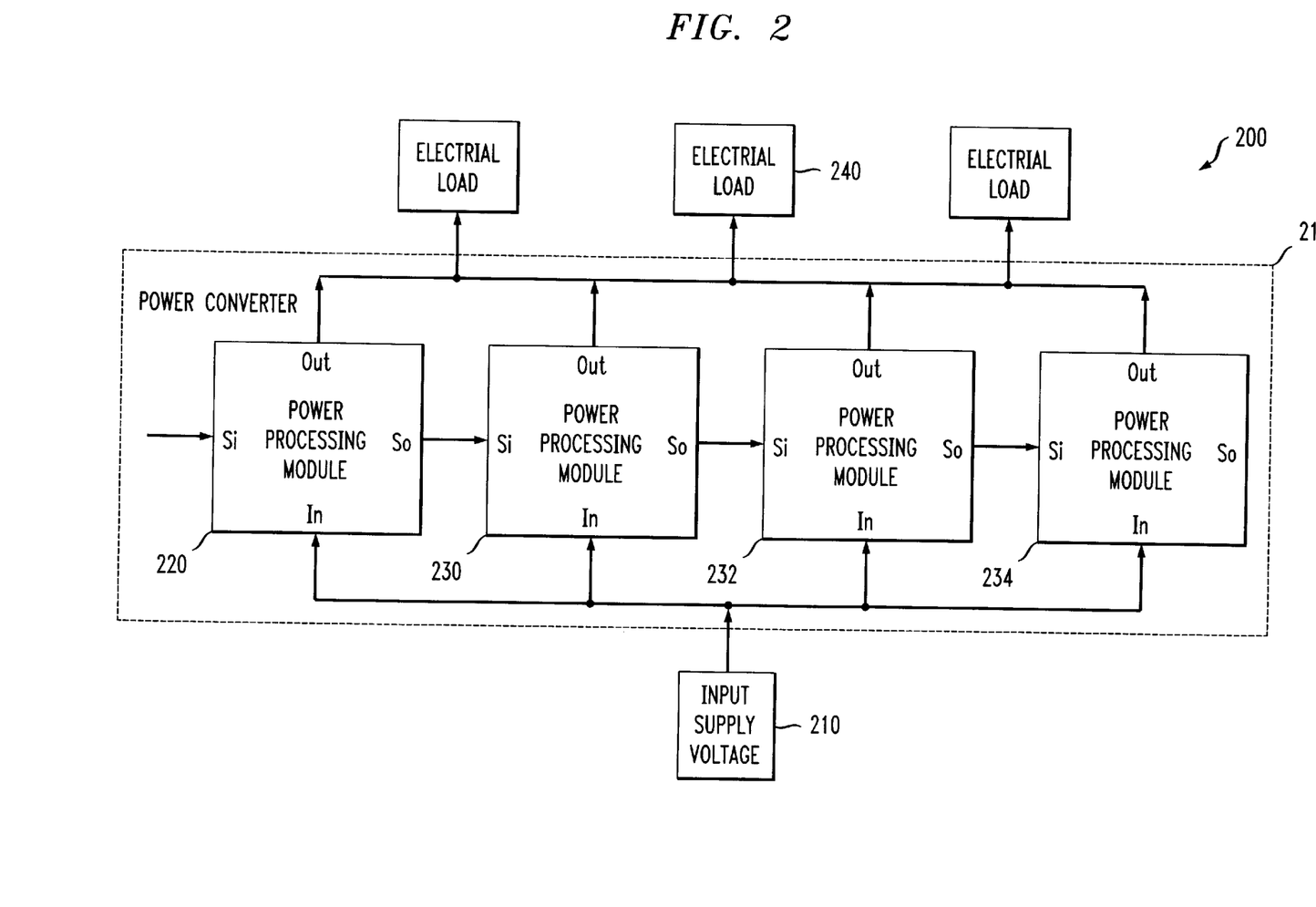
FIG. 2 illustrates an embodiment of a distributed power system employing a power converter constructed according to the principles of the present invention.

Turning now to FIG. 2, illustrated is an exemplary distributed power system 200 employing a power converter 215 constructed according to the principles of the present invention. The distributed power system 200 includes a power converter 215 coupled to an input supply voltage 210, e.g., a DC voltage source, and one or more electrical loads (generally designated as 240), such as a computer, a circuit board or a single component. The power converter 215 includes a first power processing module 220 (also called the free-running or FR module) that is coupled for control purposes in a "daisy chained" topology to second, third and fourth power processing modules 230, 232, 234 (known collectively as the synch-adjusted modules) using the power modules' respective Si and So, synchronization input and synchronization output, terminals. For purposes of processing power, the first power processing module 220 and the second, third and fourth power processing modules 230, 232, 234 are coupled in parallel. In an advantageous embodiment, the first module 220 and the second, third and fourth modules 230, 232, 234 are interchangeable, i.e., all the modules contain all the necessary elements to operate in any position within the power converter 215. To preserve full interchangeability, the system into which they are installed determines the role of each individual module.

In an advantageous embodiment, the first, second, third and fourth modules 220, 230, 232, 234 are typically buck regulator modules 100 (as illustrated in FIG. 1). The exemplary embodiment of FIG. 1 shows a non-isolated topology, however, those skilled in the art should readily appreciate that isolated topologies employing isolation transformers may also be used to advantage. The "OFF" or (1-D) ratio used to drive the low-side synchronous rectifier, i.e., diode D1 in FIG. 1, is also used as a source to provide the synchronization pulses. A conventional pulse-width-modulation (PWM) controller (not shown) is typically employed to provide low and high side drive signals to the first, second, third and fourth modules 220, 230, 232, 234. Although a paralleled distributed power system has been illustrated in FIG. 2, the present invention is not limited to paralleled power modules. Those skilled in the art should readily appreciate that the principles disclosed by the present invention may be advantageously practiced in other types of distributed power systems discussed previously.

Figure 3:
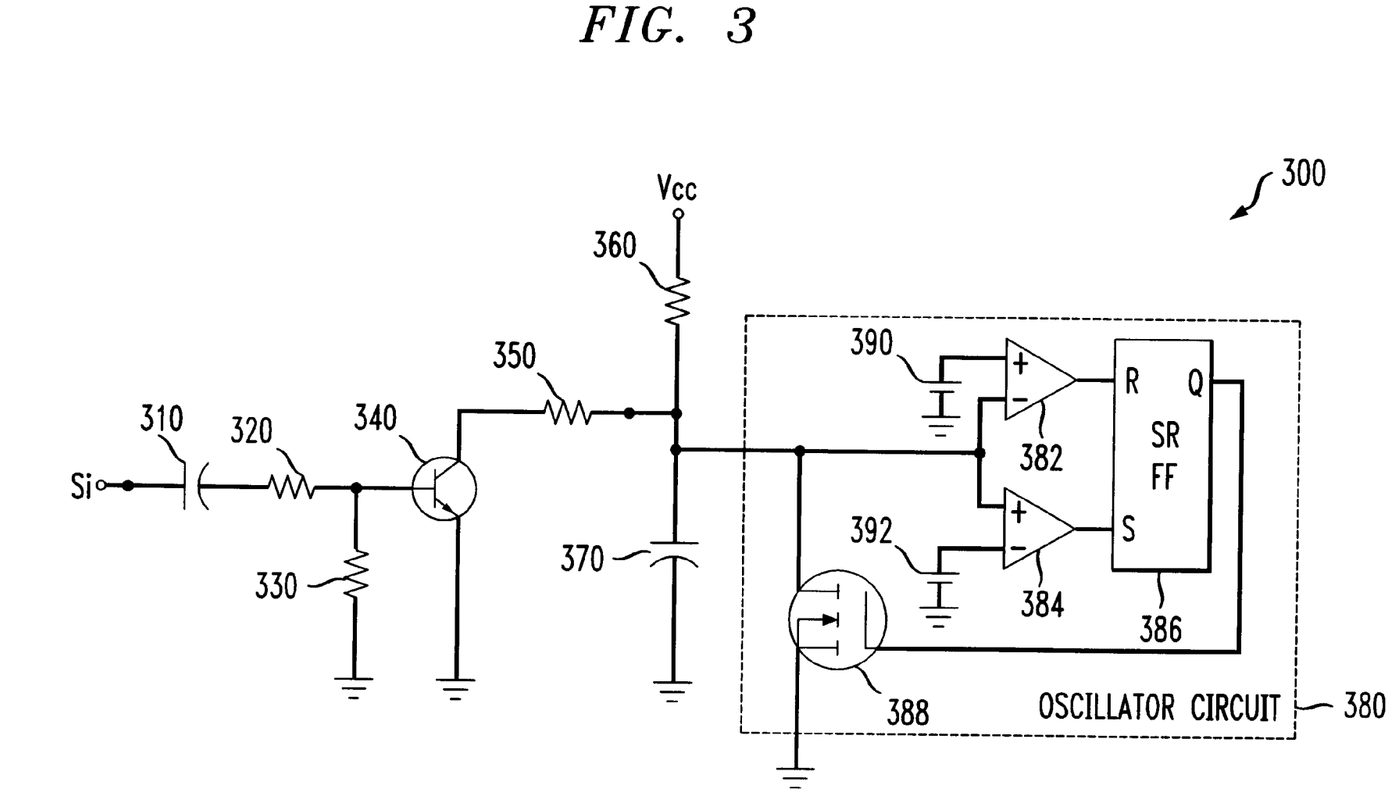
FIG. 3 illustrates a schematic diagram of one embodiment of a control circuit.

Turning now to FIG. 3, illustrated is a schematic diagram of one embodiment of a control circuit 300. The control circuit 300 includes a first capacitor 310 that is coupled to a first resistor 320. The first resistor 320 is coupled to a second resistor 330 and to the base of a transistor 340. Third and fourth resistors 350, 360 are coupled with a second capacitor 370 to an oscillator circuit 380. Also shown is a stable voltage source Vcc coupled to the fourth resistor 360. The first, second and third resistors 320, 330, 350, along with the first capacitor 310 and the transistor 340 comprise a synchronization circuit within the control circuit 300. The oscillator circuit 380 along with the second capacitor 370 and the fourth resistor 360 comprise a free-running oscillator that determines the "natural" or free-running frequency of a power processing module.

The oscillator circuit 380 includes first and second comparators 382, 384, having output nodes coupled to the reset and set input terminals, respectively, of a SR flip-flop 386. The output terminal Q of the flip-flop 386 is coupled to a transistor 388 (a metal oxide semiconductor field-effect transistor, or MOSFET, is shown) that, in turn, is coupled to the inverting node and non-inverting node of the first and second comparators 382, 384, respectively. The transistor 388 is also shown coupled to the third and fourth resistors 350, 360. A lower trip voltage reference 390 and an upper trip voltage reference 392 are coupled to the non-inverting input and the inverting input of the first and second comparators 382, 384, respectively.

The operation of the timing circuit is described hereinafter. The second capacitor 370 is charged from the voltage source Vcc through the fourth resistor 360. When the voltage across the second capacitor 370 reaches the value of the upper trip voltage reference 392, the second comparator 384 output goes high, setting an RS latch in the flip-flop 386. The output of the flip-flop 386, in turn, turns on the second transistor 388, which begins to discharge the second capacitor 370. When the second capacitor 370 is discharged to less than the lower trip voltage reference 390, the output of the first comparator 382 goes high and resets the RS latch in the flip-flop 386. The output of the flip-flop 386 turns off the second transistor 388 and the cycle repeats.

The synchronization pulses, i.e., first control signal, (which typically switch between 0V and 5V) from the "So" terminal of the first module 220 (or the preceding synch-adjusted module in the daisy chain), arrive at the "Si" terminal of the synch-adjusted modules. The pulses are the low side gate drive signals and are differentiated by the first resistor 320 and the first capacitor 310, which also serve to block any DC component. The positive spike from the differentiator drives the first transistor 340, discharging the second capacitor 370 and precipitating the synchronization mechanism.

Figure 4:
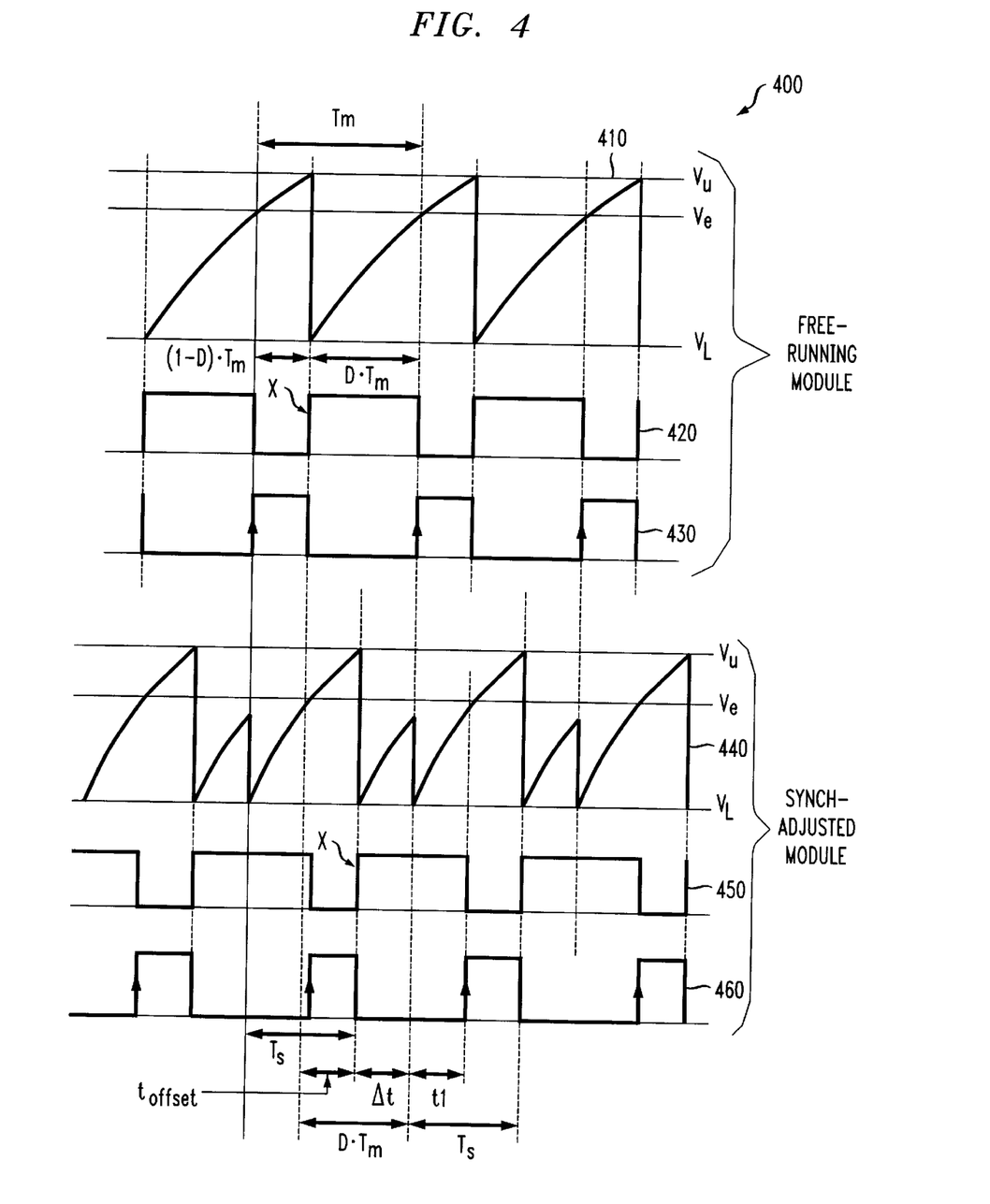
FIG. 4 illustrates exemplary synchronized waveforms employed by the free-running and synch-adjusted modules illustrated in FIG. 2.

Turning now to FIG. 4, with continuing reference to FIG. 3, illustrated are exemplary synchronized waveforms 400 employed by the first, second, third and fourth modules 220, 230, 232, 234 depicted in FIG. 2. A first waveform 410 depicts the RC charging exponential of the fourth resistor 360 and the second capacitor 370 in the FR module. A second and third waveforms depict the high side and low side gate drive signals 420, 430 in the FR module, respectively. The low side gate drive signal 430 may, in another advantageous embodiment, originate from an external synchronization source.

Similarly, a fourth waveform 440 depicts the RC charging exponential of the fourth resistor 360 and the second capacitor 370 in a synch-adjusted module. A fifth and sixth waveforms depict the high side and low side gate drive signals 450, 460 in the synch-adjusted module, respectively.

The FR module's low side gate drive signal 430 is used to synchronize the next module. The leading, positive going edge, of this "1-D" signal triggers the oscillator circuit 380 connected to the synch-adjusted module's second capacitor 370. The FR module's oscillator runs at a lower frequency than the synch-adjusted module's oscillator. Any voltage built up on the synch-adjusted module's second capacitor 370 is thus discharged by the synchronization action. This gives rise to the lower amplitude waveform illustrated in the fourth waveform 440. Following this forced discharge, the charging cycle now recommences synchronously with the positive going edge of the FR module's low side gate drive signal 430. This cycle is allowed to complete; it passes through the level Ve, the error amplifier (second comparator 384) output, at which time the oscillator circuit 380 gate drive output changes state signaling the end of the "D" period and the commencement of the "1-D", low side gate drive period.

It should be noted that as long as the exponential waveforms, i.e., first and fourth waveforms 410, 440, are below Ve, the module(s) is in the "D" state, whereas, when the exponential waveforms exceed Ve, the module(s) is then in the "1-D" state. The upper threshold level Vu, set by the second comparator 384, must be reached by the exponential to enable the oscillator circuit 380 internal MOSFET, i.e., transistor 388, to perform the principal discharge function. Following reduction of the voltage on the second capacitor 370 below the lower trip level VL, set by the first comparator 382, the cycle repeats.

The synch-adjusted module generates its own "D" and resultantly a "1-D" signal in accordance with whether the exponential ramp is above or below its own local Ve level. However, this signal has now been phase-shifted by a time period, i.e., toffset, as shown in the sixth waveform 460, i.e., low side gate drive signal 460. This phase-shift corresponds to the time differential corresponding to commencement of the positive edge, marked with an "X" on the FR module's high side gate drive signal 420 and a corresponding "X" on the synch-adjusted module's high side gate drive signal 450.

It should be noted that the present invention does not contemplate using a (1-D), or low side gate drive, signal to be the only signal that can be used to provide interleaving. Alternatively, D, or the high side gate drive, signal may be used instead. The trailing edge of the D signal could be sensed and used to provide interleaving.

With interleaving, the input current pulses are no longer synchronous, but are shifted in time. This relates to a reduction in ripple current at both the input and output terminals. Furthermore, the input current exhibits a significant component at some harmonic of the fundamental switching frequency. The amplitude and frequency of the Fourier components of the ripple current depend on the relative phase shift between the drive signals and the number of modules being paralleled. For two modules, phase-shifting their power switching by 180° is optimal. While this represents the ideal situation, there is a marked benefit resulting from interleave angles other than 180°. In the case of more than two modules, the optimal interleaving angle is given by 360°/n, where n is the number of modules being interleaved.

The offset time, i.e., time differential between corresponding high side positive transitions, between the synchronized modules is given by:

$$t_{offset} = D \cdot T_m - \Delta t \qquad (2)$$

$$\Delta t = RC \ln\left(\frac{V_f - V_i}{V_f - V_x}\right) \qquad (3)$$

where $T_m$ is the switching cycle of the FR module, R is the fourth resistor 360, C is the second capacitor 370, $V_f$ is the supply voltage (Vcc), $V_i$ is the initial voltage (approximately zero) and $V_x$ is the voltage level reached when the synchronization trigger pulse is applied (voltage at which time is to be measured from t=0 at $V_i$).

The optimum ripple current reduction in the output inductor Lf of the buck regulator module 100, illustrated in FIG. 1, occurs with an offset of $T_m/2$. The introduction of any offset, however, leads to reductions in both the input and output rms ripple current components. The amount of the reduction is dependent on how close the offset is to $T_m/2$. The existence of an adjustable term, $\Delta t$, in equation (2) provides a means for tuning the modules to the optimum offset. The ramp time constant RC, which affects the natural frequency of the synch-adjusted modules, can be varied to bring the system closer to the ideal offset value.

To illustrate, assuming an input voltage of 5V and an output voltage of 3.3V. Ignoring voltage drops due to resistive effects and diodes, the duty cycle, D, (from equation (1)) is 0.66. For optimal ripple current reduction, as mentioned above, $t_{offset}$ must be equal to $T_m/2$. Equation (2) reduces to:

$$\Delta t = (0.16) T_m$$

but also from FIG. 4;

$$T_m = T_s \Delta t \qquad (4)$$

leading to an equation in terms of frequencies of:

$$f_s = (1.19) f_m$$

where $f_s$ is the synch-adjusted module's free-running, or non-synchronized frequency and $f_m$ is the FR module's free-running frequency.

The above result for the optimum synch-adjusted module's frequency, in terms of the FR module's frequency, is for the case of two modules. The calculation can quite easily be repeated for three modules where the optimum phase-shift will be Tm/3 or for n modules where the optimum phase-shift is Tm/n. If the number of modules to be paralleled is unknown, or a variable, then no special effort need be made to adjust the synch-adjusted frequencies. Similarly if the number of modules to be paralleled is more than above five, then the advantages of frequency adjustment are also lost. This is due to the increasingly random distribution of the offset times incurred with a large number of modules.

From the illustration above, if the free-running frequency of the synch-adjusted modules is 1.19 times the FR module's free-running frequency, optimal ripple current reduction is achieved without changing the required duty cycle or losing synchronization. No special trimming is necessary since suitable capacitor values for the FR and synch-adjusted modules may be calculated during design.

The control circuit 300 requires that the synch-adjusted module's free-running frequency be higher than the FR module's free-running frequency to prevent circuit malfunction. The range of free-running frequencies, or synchronization capture range, may be expressed by the following expression:

$$f_{min} \leq f_{sync} \leq f_{max} \qquad (5)$$

where $f_{min}$ or the lowest frequency at which the FR module may be operated and is given by:

$$f_m = \left(1 - \frac{D}{2}\right) f_s \qquad (6)$$

and $f_{max}$ or maximum frequency of operation is when $f_m$ (FR module's free-running frequency) and $f_s$ (synch-adjusted module's free-running frequency) are the same. Equation (6) is derived by considering the timing relationships in FIG. 4 for the limit situation where $\Delta t = t_1$, corresponding to the lowest possible frequency of operation.

The range of frequencies for synchronization as given by equality (5) represents the ideal situation only. Actual components exhibit tolerances leading to a Gaussian distribution around their nominal values. While the equality of (5) still applies, care must be taken to ensure that the frequency distributions associated with real components fall below fmax and above fmin. This means that the actual synchronization range will be less than that indicated by equality (5). Obviously, use of precision components will result in narrower distributions, greater accuracy, and expansion of the synchronization range.

The oscillator circuit 380 may be embodied in an integrated circuit (IC), such as a commercially-available Unitrode UCC3803. If, however, a pulse width modulation (PWM) IC is employed (UCC3803 or similar ICs), it is important to ensure that the second capacitor 370 is charged to the upper trip voltage, i.e., upper trip voltage reference 384. If the upper trip voltage is not achieved, the IC's 380 output latch (not shown) does not toggle and the IC's 380 output remains low. It should be noted that the requirement for the second capacitor 370 to always be charged to the upper trip voltage requires that the synchronization signal be lower in frequency than the natural, i.e., unsynchronized free-running, frequency of the synch-adjusted modules. Therefore, the FR module must be running at a lower frequency than the synch-adjusted modules' natural frequency.

The FR module has an unconnected, or floating, Si terminal. This condition provides the means by which the FR module can be made to operate at the lowest frequency with regard to the synch-adjusted modules. An exemplary frequency-setting circuit which performs the frequency-setting function is illustrated in FIG. 5.

Figure 5:
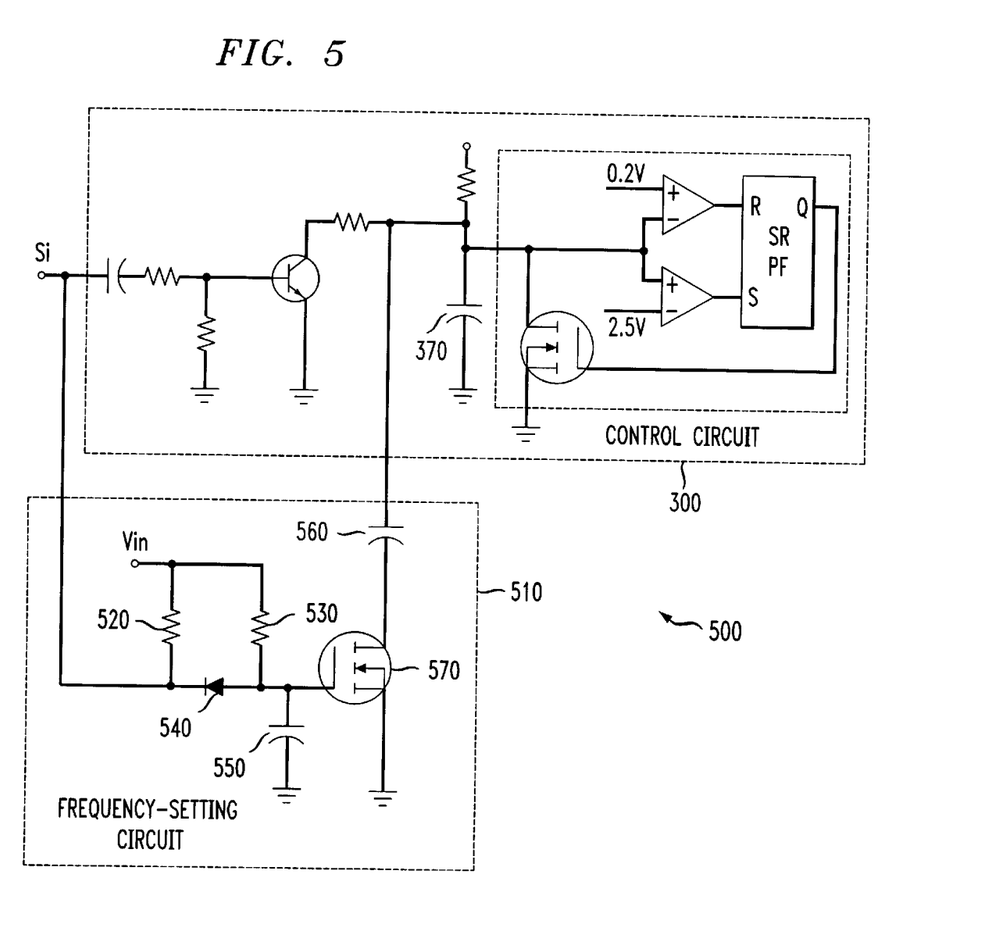
FIG. 5 illustrates a schematic diagram of one embodiment of a free-running (FR) module circuit for the free-running module illustrated in FIG. 2.

Turning now to FIG. 5, with continuing reference to FIGS. 2 and 3, illustrated is a schematic diagram of one embodiment of a FR module circuit 500 for the first module 220 illustrated in FIG. 2. The FR module circuit 500 includes the control circuit 300 illustrated in FIG. 3 and a frequency-setting circuit 510. The frequency-setting circuit 510 includes first and second resistors 520, 530 that are coupled to a voltage source Vin and a diode 540, which is typically a Schottky diode. A first time-constant capacitor 550 is illustrated as being coupled to the second resistor 530 and to a transistor 570 (a MOSFET is shown) that, in turn, is coupled to a second frequency-setting capacitor 560. The second frequency-setting capacitor 560 is coupled to the control circuit 300.

As discussed previously, in the first module 220, the Si terminal is a floating, unconnected terminal. With Si floating, the first capacitor 550 is charged through the second resistor 530. As the first capacitor 550 is being charged, the gate of the transistor 570 is also being charged up to Vgs(th), at which time, the transistor 570 turns ON. When transistor 570 is ON, i.e, conducting, the second frequency-setting capacitor 560 is connected in parallel with the second capacitor 370, in the control circuit 300, lowering the frequency of the free-running oscillator. The values of the second resistor 530 and the first capacitor 550 are selected such that several switching periods are required to charge the first capacitor 550 to Vgs(th).

In the synch-adjusted modules, the first capacitor 550 also begins to charge through the second resistor 530. The first capacitor 550, however, is discharged through the Schottky diode 540 when the input synchronization signal on Si goes low. The gate of the transistor 570, therefore, never reaches Vgs(th). With the transistor 570 never turning on, the second frequency-setting capacitor 560 is never active and the synch-adjusted modules retain their faster charge rate under the control of the synchronization signal. The Schottky diode 540 blocks the input synchronization voltage from being applied to the first capacitor 550 when the input synchronization signal on Si goes high.

In the exemplary embodiments described above, the lower frequency requirement for the FR module as opposed to the synch-adjusted module(s) was emphasized. It should be noted, however, that the lower frequency requirements only applies to a "discharging" type synchronization pulse. A "charging" type synchronization pulse requires that the synchronization pulse be at a higher frequency than the synch-adjusted module's free-running frequency. With a charging type synchronization pulse, the logic of the frequency-setting circuit 510 is reversed. Another embodiment of a frequency-setting circuit is illustrated in FIG. 6.

Figure 6:
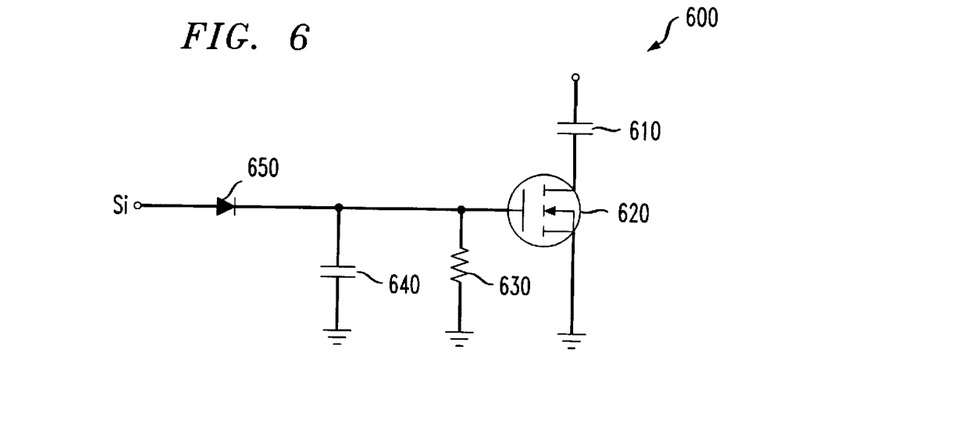
FIG. 6 illustrates a schematic diagram of another embodiment of a free-running module frequency-setting circuit for use with a charging type synchronization pulse.

Turning now to FIG. 6, illustrated is a schematic diagram of another embodiment of a FR module frequency-setting circuit 600 for use with a charging type synchronization pulse. The frequency-setting circuit 600 includes a first and second capacitors 610, 640, a transistor 620, a resistor 630 and a diode 650. The frequency-setting circuit 600 lowers the frequency of a synch-adjusted module when a synchronization pulse is present at the Si terminal, ensuring that the frequency of the FR module is always higher than the frequency of the synch-adjusted module.

Although specific embodiments of the present invention have been disclosed and described in detail above, those skilled in the art should appreciate that alternative circuits may also be implemented to achieve the same results. For instance, the synch-adjusted modules can all be forced to a higher frequency than the FR module. The circuit injects equal packets of charge onto the timing capacitor (capacitor 370 in the described embodiments) by using a differentiator to provide constant area pulses independent of the input signal duty cycle.

With regard to the FR module, in the absence of a drive signal to the terminal Si, the charge pump is not activated and the FR module runs at its natural frequency. The synch-adjusted modules all exhibit shortened periods due to the charge injection which satisfies the requirement that the FR module be running at the lower frequency and the control circuit described above is unchanged.

From the above, it is apparent that the present invention provides a system and method for synchronizing power modules in a daisy chain with an interleaving switching synchronization feature that reduces the output ripple current. The reduction in the ripple current decreases the number of input or output filter capacitors required and also reduces the EMI generated by the power modules. An external synchronization signal may also be used with identical benefits; the modules may be synchronized to an external system clock, thus allowing for system wide EMI reductions. Furthermore, the present invention may provide the use of paralleled standard power modules to increase the output capability, allowing for a simple expansion for new system designs. The present invention also discloses a novel circuit to provide for automatic control of the FR module allowing a standard power module to operate as either a FR or synch-adjusted module with no modifications required.

Although the present invention and its advantages have been described in detail, those skilled in the art should understand that they can make various changes, substitutions and alterations herein without departing from the spirit and scope of the invention in its broadest form.

What is claimed is:

1. A power processing module, comprising:
   a synchronization input terminal adapted to receive a first control signal;
   a free-running oscillator that generates a gate drive signal for controlling a switch of said power processing module, said gate drive signal having a frequency that is a free-running frequency of said power processing module;
   a synchronization circuit, coupled to said synchronization input terminal and said free-running oscillator, that synchronizes said gate drive signal with said first control signal; and
   a frequency setting circuit, coupled to said synchronization input terminal and said free-running oscillator, that modifies an operation of said free-running oscillator.

2. The power processing module as recited in claim 1 wherein said synchronization circuit phase-shifts said gate drive signal with respect to said first control signal.

3. The power processing module as recited in claim 1 further comprising a synchronization output terminal, coupled to said free-running oscillator, that provides said gate drive signal.

4. The power processing module as recited in claim 1 wherein said frequency setting circuit lowers a frequency of said gate drive signal with respect to said first control signal.

5. The power processing module as recited in claim 1 wherein said synchronization circuit detects a rising edge of said first control signal.

6. The power processing module as recited in claim 1 wherein said first control signal is lower in frequency than said free-running frequency of said power processing module.

7. The power processing module as recited in claim 1 wherein said first control signal and said gate drive signal are pulse width modulated.

8. A method of synchronizing a plurality of power processing modules, comprising the steps of:
   receiving a first control signal from a first power processing module at a synchronization input terminal of a second power processing module;
   generating a gate drive signal for controlling a switch in said second power processing module;
   synchronizing said gate drive signal with said first control signal;
   modifying an operation of a free-running oscillator in one of said plurality of power processing modules with a frequency setting circuit; and
   providing said gate drive signal to a synchronization output terminal of said second power processing module.

9. The method as recited in claim 8 wherein said step of synchronizing further comprises a step of phase-shifting said gate drive signal with respect to said first control signal.

10. The method as recited in claim 8 wherein said frequency setting circuit lowers a frequency of said gate drive signal with respect to said first control signal.

11. The method as recited in claim 8 wherein said first control signal is lower in frequency than said second power processing module natural frequency.

12. The method as recited in claim 8 wherein said stop of synchronizing comprises a step of detecting a rising edge of said first control signal.

13. The method as recited in claim 8 wherein said first control signal and said gate drive signal are pulse width modulated.

14. A distributed power system, comprising:

a power converter that receives input power from an input power source and converts said input power to provide output power to an electrical load, said power converter containing a plurality of power processing modules, each of said plurality of power processing modules having a switch and including:

a synchronization input terminal adapted to receive a first control signal, a free-running oscillator that generates a gate drive signal for controlling a switch of said power processing module, said gate drive signal having a frequency that is a free-running frequency of said power processing module, a synchronization circuit, coupled to said synchronization input terminal and said free-running oscillator, that synchronizes said gate drive signal with said first control signal, and frequency setting circuit, coupled to said synchronization input terminal and said free-running oscillator, that modifies an operation of said free-running oscillator.

15. The distributed power system as recited in claim 14 wherein said synchronization circuit phase-shifts said gate drive signal with respect to said first control signal.

16. The distributed power system as recited in claim 14 wherein frequency setting circuit lowers a frequency of said gate drive signal with respect to said first control signal.

17. The distributed power system as recited in claim 14 wherein said synchronization circuit detects a rising edge of said first control signal.

18. The distributed power system as recited in claim 14 wherein said first control signal is lower in frequency than a natural frequency of said plurality of power processing modules.

19. The distributed power system as recited in claim 14 wherein said first control signal and said gate drive signal are pulse width modulated.

* * * * *